US008196828B2

(12) United States Patent
Kelly

(10) Patent No.: US 8,196,828 B2
(45) Date of Patent: Jun. 12, 2012

(54) ASSISTED SIGHTING SYSTEM FOR SNIPERS

(75) Inventor: Kurtis L. Kelly, Richfield, OH (US)

(73) Assignee: Lockheed Martin Corporation, Bethesda, MD (US)

( * ) Notice: Subject to any disclaimer, the term of this patent is extended or adjusted under 35 U.S.C. 154(b) by 393 days.

(21) Appl. No.: 12/489,685

(22) Filed: Jun. 23, 2009

(65) Prior Publication Data

US 2009/0320348 A1 Dec. 31, 2009

Related U.S. Application Data

(60) Provisional application No. 61/133,047, filed on Jun. 25, 2008.

(51) Int. Cl.
*G06G 7/80* (2006.01)
(52) U.S. Cl. .............................. 235/404; 42/114; 42/146
(58) Field of Classification Search .................. 235/404; 42/114, 146
See application file for complete search history.

(56) References Cited

U.S. PATENT DOCUMENTS

| | | | | |
|---|---|---|---|---|
| 4,028,673 A | * | 6/1977 | Taylor et al. | 382/100 |
| 4,182,570 A | * | 1/1980 | Courrier et al. | 356/28 |
| 6,247,259 B1 | * | 6/2001 | Tsadka et al. | 42/114 |
| 6,490,060 B1 | | 12/2002 | Tai et al. | 359/15 |
| 6,496,252 B1 | * | 12/2002 | Whiteley | 356/121 |
| 2007/0158493 A1 | * | 7/2007 | Shapira et al. | 244/3.16 |
| 2007/0187546 A1 | * | 8/2007 | Layton | 244/3.1 |
| 2010/0128136 A1 | * | 5/2010 | Belenkii | 348/222.1 |

OTHER PUBLICATIONS

*The spectrum of turbulence;* Taylor, Proceedings of the Royal Society Feb. 18, 1938; pp. 476-490.
*Wind measurements by the temporal cross-correlation of the optical scintillations;* Wang et al.; Applied Optics; Dec. 1, 1981; vol. 20, No. 23.
*Remote sensing of crosswind profiles using the correlation slope method;* Barakat et al.; J. Opt. Soc. Am; vol. 69; No. 11; Nov. 1979.
*Use of Scintillations to measure Average Wind Across a Light Beam;* Lawrence et al.; Applied Optics; Feb. 1972; vol. 11, No. 2.

* cited by examiner

*Primary Examiner* — Daniel Hess
(74) *Attorney, Agent, or Firm* — Renner Kenner Greive Bobak Taylor & Weber

(57) ABSTRACT

A spotter scope including an illuminator that generates a ranging signal is disclosed. The spotter scope further includes an imaging device with a focal plane array which detects backscatter radiation created by the ranging signal, and a controller which calculates a distance to a target. The controller also creates a wind profile between the spotter scope and the target based on scintillation statistics of backscatter detected by the focal plane array and provides corrective aiming instructions based on the wind profile.

15 Claims, 5 Drawing Sheets

ASSISTED SIGHTING SYSTEM FOR SNIPERS

CROSS-REFERENCE TO RELATED APPLICATION

This application claims priority of U.S. Provisional Application Ser. No. 61/133,047 filed Jun. 25, 2008, which is incorporated herein by reference.

TECHNICAL FIELD

Generally, the present invention relates to a sighting system for small-arms weapons. Specifically, the present invention relates to a sighting system for small-arms weapons that can calculate the distance to a target, deduce the effects of the spatial wind profile along the intended trajectory, and provide appropriate corrective aiming instructions to a shooter.

BACKGROUND

Sighting devices have long been used to help shooters improve the placement of their small-arms weapons' fired shots. Small-arms weapons include those firearms that an individual may carry and use. Many handguns, for instance, include unmagnified iron sight devices with horizontal and vertical reference points that allow a shooter to align the gun parallel to the shooter's line of sight. Other firearms, such as carbines, rifles, assault rifles and light machine guns may include magnified sight devices (which are also known as telescopic sights, or scopes) to provide a shooter with improved accuracy in aligning the barrel with the intended target. These magnified sight devices are especially useful for hunters, sharpshooters, and others who find it advantageous to shoot at targets from a great distance. Successfully hitting any target depends on a shooter's ability to understand a bullet's likely flight path, or trajectory, before the bullet is fired.

Several factors influence the trajectory of a fired bullet, including those factors that are internal to the firearm and those factors that are external to the firearm. Factors internal to the firearm relate to the type of firearm and ammunition used. These are commonly referred to as ballistic characteristics. For instance, similar .22 caliber bullets will travel slightly different trajectories if fired from a revolver than if from a rifle because of differences in the ballistic characteristics between the revolver and the rifle. Also, different types of ammunition have different bullet shapes, casing sizes, and amounts of gunpowder. Each of these characteristics influences the performance of the ammunition. Understanding the characteristics of a particular firearm and particular ammunition is important to understanding the likely trajectory of a fired shot.

Factors external to the firearm which influence the trajectory of a bullet include the distance to a target (also known as range), wind, and other ambient environmental conditions. A fired bullet is under constant earthward acceleration due to gravity, and this is known as "bullet drop." Bullet drop is characterized by a bullet path which curves increasingly toward the Earth over long ranges as the bullet falls to the ground. Therefore, in order to hit a faraway target, it is necessary to compensate for bullet drop by elevating the barrel of the firearm, and, thus, the aiming point. Wind is another factor that can influence bullet trajectory. It is recognized that a crosswind has the effect of deviating a bullet's trajectory resulting in offsets from the intended target seen at the aiming point. A crosswind along the path of the bullet has the effect of decreasing the effective range of the weapon since the bullet can be blown off course of its intended target at relatively close range. The deviation caused by wind increases as the wind velocity increases and as the range increases. Thus, understanding the distance to a target and the characteristics of any crosswinds are important to understanding the likely trajectory of a fired shot. Between the factors internal and external to a firearm, hitting a target at long range can be a challenge.

Because of this challenge, sharpshooters whose targets are very far away are often assisted by a spotter. A sharpshooter and a spotter together are often referred to as a shooting pair. The shooter operates the firearm by aiming it at a distant target and ultimately shooting a bullet. A spotter assists the shooter by measuring or estimating the distance to the target and observing wind velocity and direction, and then communicating this information to the shooter. A shooter then adjusts the aim of the firearm in view of this information with the goal of compensating for bullet drop and the influence of wind. The shooter then uses the firearm to shoot a bullet. In the event the shooter misses the target on the first shot, the spotter determines the hit point deviation from the aiming point, and relays this information to the shooter. If circumstances allow (i.e., the target has not moved), the shooter may then attempt subsequent shots. However, efficiency and stealth are highly prized by the shooting pair, so missed shots and multiple shots are undesirable. Thus, a need exists for technology that can improve the effectiveness of a shooter and spotter shooting pair.

Methods for measuring wind velocity have been developed, but are not optimal to the gun sight arts. Laser Doppler Velocimetry attempts to track the movement of the wind by tracking the motion of individual slices of the atmosphere. Such a system is particularly optimized for measuring the wind in the direction along the line-of-sight and by use of a clever receiving system, one could get an approximation of the cross wind. However, attempts to implement this practice with current shooting-pair concepts of operation have been unacceptable. Scintillometer statistics use a method that historically has implemented so-called "dual-ended" systems which require an illuminator and an imaging device or other set of detectors at opposite ends of the optical path in order to characterize the wind along the bullet trajectory. Applied to the gun sight arts, this method would require an imaging device located at the target, and for obvious reasons, such an arrangement would be impractical. A single-ended system, such as coherent Doppler Laser LIDAR, could be used, but it requires large collection apertures to detect laser guide stars. Such a system relies on aerosol backscatter, which is one practical method for measuring cross wind, but to this point has not been employed. In any event, implementation of such a system requires a powerful laser which could not be well maintained in the field. As such, prior art fails to disclose a single-ended system that is capable of meeting the objects of the present invention.

Thus, a need exists in the art for a compact sighting system that is capable of gathering accurate information including the distance to a target and a profile of the wind along the path to the target, and communicating corrective aiming instructions to a shooter.

SUMMARY OF THE INVENTION

In light of the foregoing, it is a first aspect of the present invention to provide an assisted sighting system for snipers.

Another aspect of the present invention is to provide an assisted sighting system for aiming at a target, comprising an illuminator that generates a ranging signal projected at a target, an imaging device including a focal plane array, the focal plane array detecting backscatter radiation created by the ranging signal, and a controller connected to the illuminator and the imaging device, wherein the controller calculates a distance to a target, creates a profile of any wind between the spotter scope and the target based on scintillation statistics of backscatter radiation detected by the focal plane array, and generates corrective aiming instructions based on the profile.

Yet another aspect of the present invention is to provide a method of improving a shooter's accuracy when firing ammunition from a weapon, the method comprising illuminating a target with a ranging signal generated by a laser, collecting with a focal plane array backscatter radiation generated by the ranging signal interacting with optical turbulence, calculating a distance to the target, calculating a wind profile between the laser and the target based on scintillation statistics of backscatter radiation detected by the focal plane array, calculating aiming instruction corrections based on the distance to the target, ballistics information for the ammunition and the weapon, and the wind profile, and displaying the aiming instruction corrections.

BRIEF DESCRIPTION OF THE DRAWINGS

This and other features and advantages of the present invention will become better understood with regard to the following description, appended claims, and accompanying drawings wherein:

BEST MODE FOR CARRYING OUT THE INVENTION

Figure 1:
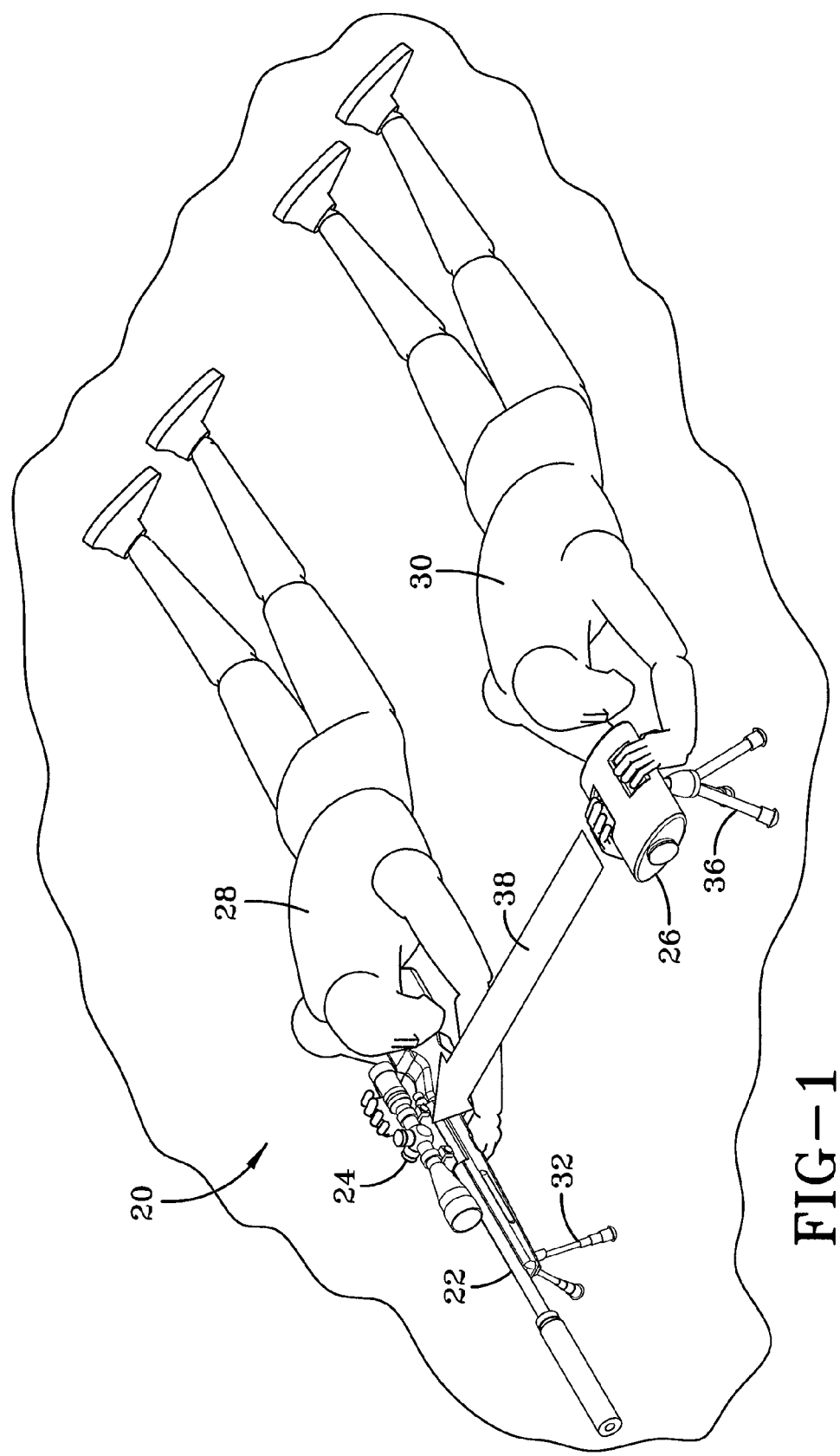
FIG. 1 is a schematic representation of a sharpshooter and a spotter using an assisted sighting system constructed according to the concepts of the present invention.

Referring now to the drawings, an assisted sighting system is designated generally by the numeral 20 and is configured for use in conjunction with a rifle 22 or other small-arms weapon and includes a telescopic sight 24 or similar sighting device along with a spotter scope 26. According to the embodiment shown in FIG. 1, a sharpshooter 28, also referred to herein as a sniper, and spotter 30 lie prone in simulated operational positions. The sharpshooter 28 controls the rifle 22, optionally supported by a bipod 32, and looks at a distant target 34 (shown in FIG. 4) through the telescopic sight 24. The spotter 30 looks at the same distant target 34 using the spotter scope 26, which may be supported by a tripod 36. As will be discussed further below, the spotter scope 26 computes the distance to the distant target and a wind profile for the wind between the spotter scope 26 and the distant target 34. The spotter scope 26 then communicates by wired or wireless communication 38 corrective aiming instructions 40, 42 (shown in FIG. 5) to the telescopic sight 24 that may be seen by the sharpshooter 28 in a viewing area 44 of the telescopic sight 24. The sharpshooter 28 may then adjust the aim at the distant target 34 appropriately. While the present drawings and discussion relate to an embodiment of the invention where the spotter controls the spotter scope, the invention could also be constructed so that the sharpshooter controls both the spotter scope and the rifle with the telescopic sight. Alternatively, the features of the scope 26 may be incorporated into the rifle 22.

Figure 2:
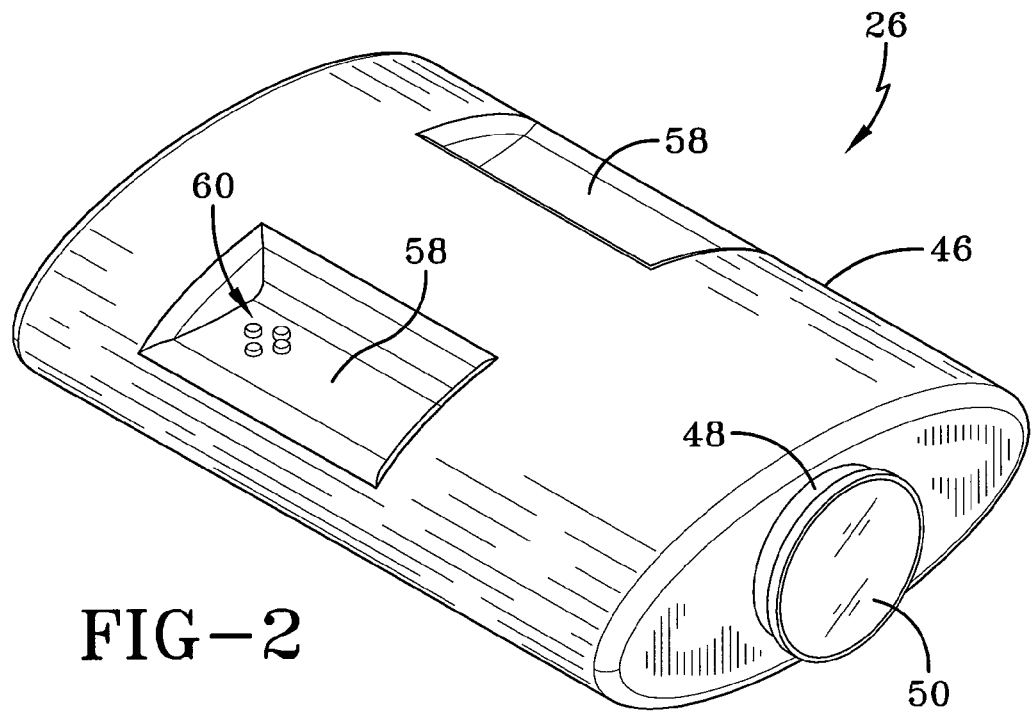
FIG. 2 is a top perspective view of a spotter scope of the assisted sighting system constructed according to the concepts of the present invention.
Figure 3:
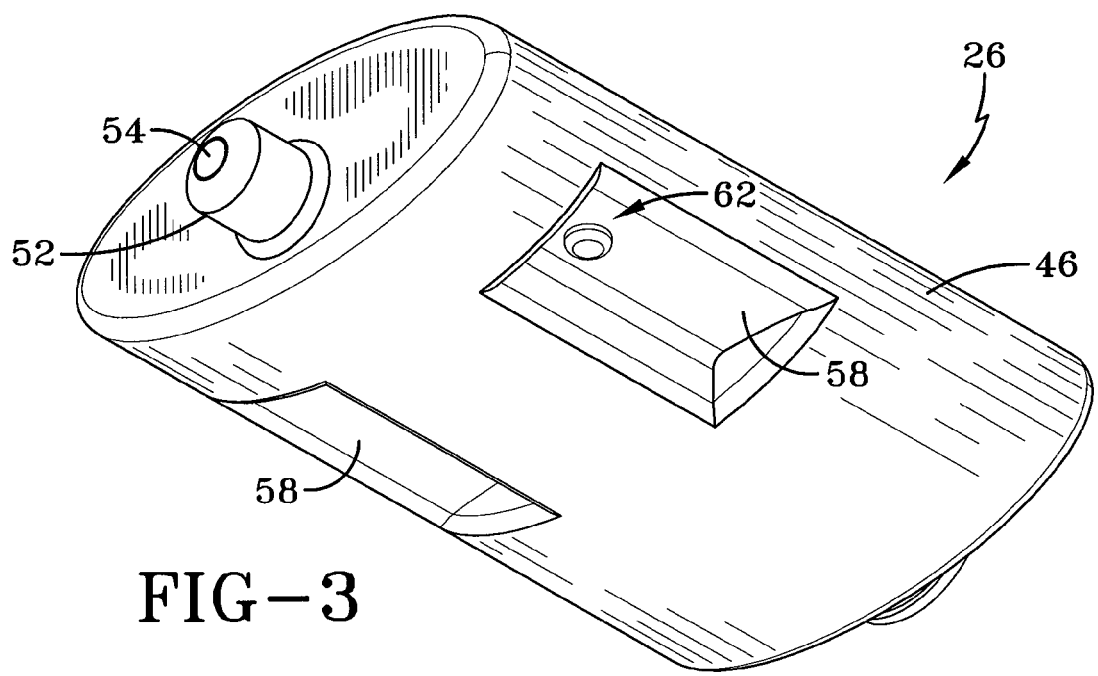
FIG. 3 is a bottom perspective view of the spotter scope shown in FIG. 2.
Figure 4:
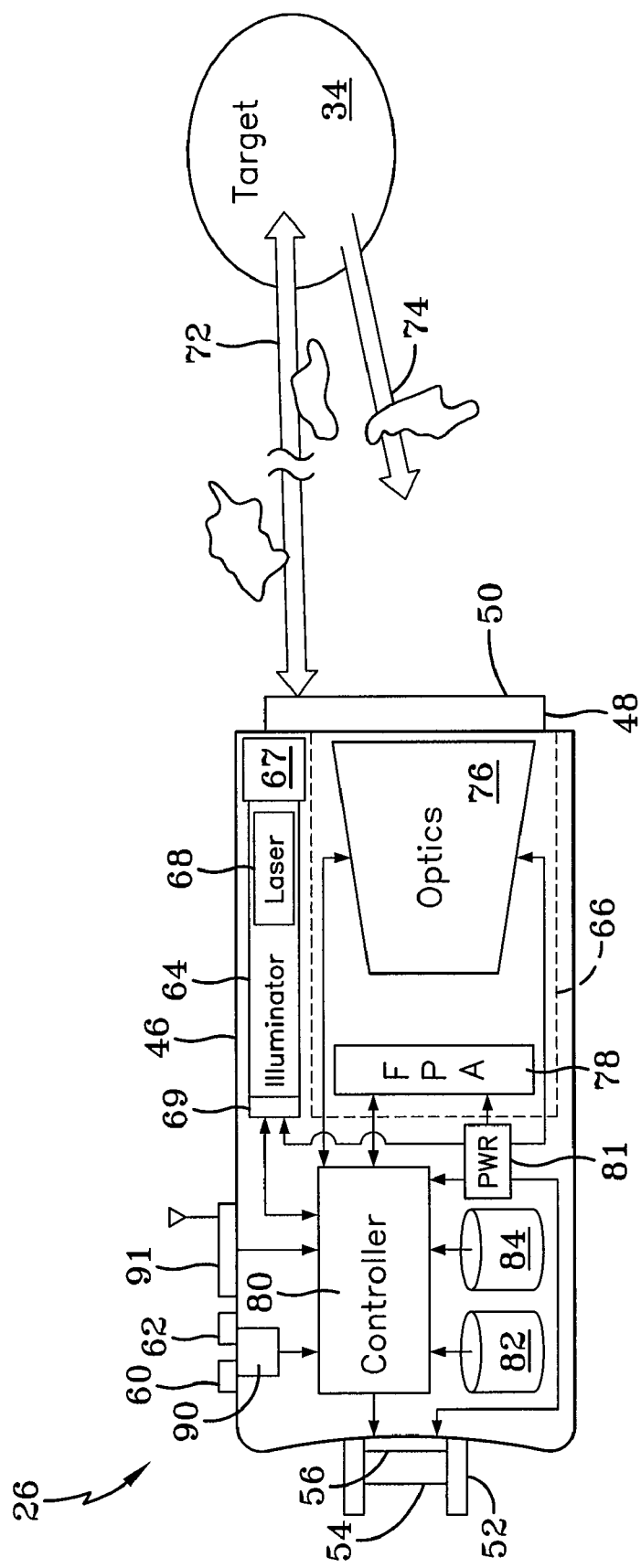
FIG. 4 is a schematic representation showing components of the spotter scope of the assisted sighting system constructed according to the concepts of the present invention.

Turning now to FIGS. 2-4, the spotter scope 26 is shown and, as will be described, includes the necessary hardware and software for computing distances to distant targets, profiling the wind between the spotter scope and a distant target, and wirelessly communicating corrective aiming instructions to an associated telescopic sight on a weapon. The aiming instructions can also be transmitted by other conventional means. The spotter scope 26 has a body 46 that encloses the elements used to transmit and receive light information. On the target-facing, or front, portion of the spotter scope 26, an annular protrusion 48 extends from the body 46 and has a window 50. On the other end, or rear portion of the spotter scope 26, an eyepiece 52 extends from the body 46 and has a viewing window 54 where the spotter 30 may view an internal display 56. On both the bottom and top surfaces of the spotter scope 26, the body 46 includes hand grip areas 58 that are adapted to provide the spotter 30 with improved grip and control when handling the spotter scope 26. Also, the spotter scope 26 includes buttons 60, 62, on the top and bottom, respectively, used by the spotter 30 in operation of the spotter scope 26. The buttons 60, 62 may be used to perform any number of tasks including, but not limited to, focusing, inputting data regarding environmental conditions, ballistics, location, and so on.

Again, the spotter scope 26 has the ability to both transmit and receive light information. As will be discussed, the spotter scope 26 includes an illuminator 64 (transmit function) and an imaging device 66 (receive function). The illuminator 64 includes at least a laser 68, a fiber-coupled laser or other suitably collimated source such as a light-emitting diode, or LED, capable of producing light in the visible to infrared spectrum range. Skilled artisans will appreciate that the illuminator could alternatively generate infrared light, visible light or other detectable radiation. The illuminator 64 also functions as a laser range finder which will be familiar to people skilled in the art of hunting and shooting. However, the scope 26 may be provided with the range finder separate. The rangefinder operates by transmitting a burst of light and measuring the time-of-flight of that burst as it travels towards the target, is reflected, and travels back. Such time-of-flight recording devices come in various configurations, but the principal is the same on each; the illuminator 64 emits a pulse of light, measures the round trip time of the pulse, and determines distance to the target by multiplying the time-of-flight by the speed of light. The illuminator 64 may also optionally include a collimating assembly 67, such as a collimator, for modifying the laser light before it leaves the spotter scope. The collimating assembly 67, which may consist of a lens or a series of lenses, emits a beam narrow enough in angular extent such that sufficient power is detected at a range finder receiver 69. An anti-reflection coating may be used on the lenses to increase their light transmission properties. Indeed, the collimating assembly 67 limits the beam spread or divergence of the light generated by the illuminator 64 to approximately the same angular extent as potential targets when viewed from the shooter's position. It will further be appreciated that the collimating assembly 67 has an aperture sized so as to emit spherical waves. Specifically, the size of the collimating assembly's transmitting aperture is less than a Fresnel size, a concept familiar to those in the art of designing optical devices. In some configurations of the invention, the range finder receiver 69 and the imaging device 66 may be one and the same. Short pulses, or bursts, of light are used by the laser range finder. The pulses are reflected by the intended target and are collected by the receiver 69 and processed by a controller as will be discussed. The laser light that travels from the spotter scope to the target is referred to as a ranging signal 72.

Along the path to the distant target, the ranging signal 72 traverses variations in the index of refraction, commonly referred to as optical turbulence, represented by "miniclouds" in FIG. 4, causing the wavefront and light intensity to be perturbed from equilibrium. This phenomenon is commonly known as scintillation. Optical turbulence is a naturally occurring phenomenon which is present when there are mild temperature gradients along the path. The turbulence is characterized by mixing sizes referred to as eddies which have a generally accepted spectrum. The effect these eddies have on wave propagation is characterized by weak lenslets which manifest as observable scintillation of the laser beam. These small scale eddies are transported by the wind and by observing the spatio-temporal behavior of the illumination pattern, the wind profile can be deduced which will be explained in further detail below. In any event, this scintillated radiation is partly reflected and constitutes return signals 74 (as shown in FIG. 4) that propagate back toward the spotter scope and are received by its imaging device 66.

The imaging device 66 of the spotter scope 26 comprises the optical components necessary to collect, process, and deliver the return signals to a detector. Inside the body 46, the imaging device includes optics 76 which comprise a single lens or a series of lenses that are arranged to collect, concentrate, and optionally spectrally filter the return signals that impinge the window 50. The return signals 74 are focused by the optics 76 at the plane of a focal plane array 78. The optics 76 may consist of one or more refractive and reflective elements. Additionally, the optical path may be folded to reduce the overall size of the device. Other features of the optics 76 are that the focal length may be approximately 1.5 meters and has a collection aperture sized so that the signal-to-noise ratio of received radiation is sufficient to perform signal processing required to characterize the scintillation properties of the signals 74. The focal plane array 78 may be made of indium gallium arsenide, or any similar material that is sensitive to the reflected radiation, such as Germanium or Silicon. The focal plane array 78 is comprised of an array of light-sensing pixels (not shown), such as in a 16×16, 32×32 or any appropriately-sized pixel array arrangement. Individual pixel size is approximately 25 microns or such that the image of the intended target covers a majority of the pixels. The array allows the measurement to be made multiple times in a short duration to improve the performance in the measurement of the return signals. It will further be appreciated that the control of the frame rate and region of interest is variable based on engagement scenarios.

The spotter scope 26 includes a controller 80 that provides the necessary hardware, software and memory to control operation of the scope. The controller is electrically connected to components within the scope 26 to coordinate operation thereof. The controller 80 is powered by a power supply 81 which may be any type of battery, optionally rechargeable. The power supply 81 is also connected to other components—display 56, laser 68, optics 76, focal plane array 78, user input 90, and transceiver 91—within the scope which requires electrical power to operate as intended. In addition to memory storage devices incorporated into the controller, the controller is connected to and communicates with a wind database 82 and a ballistics database 84 which holds ballistics information for a wide range of environmental conditions and candidate bullets. The databases may be preloaded with relevant data that is utilized by the controller 80 to calculate aiming information that is eventually transmitted to the shooter. As will be discussed in detail, the controller 80 creates a profile of any crosswind between the spotter scope and the target based on scintillation statistics of backscatter radiation detected by the focal plane array and generates corrective aiming instructions based on the profile.

On location information may be input by the spotter using buttons 60 wherein the information is processed by a user input interface 90. The controller 80 is also electrically connected to the laser 78, the display 56, the optics 76—for focusing control, the focal plane array 78, and a transceiver/antenna 91. Skilled artisans will appreciate that an emitter/antenna could be used in place of the transceiver/antenna.

Figure 6:
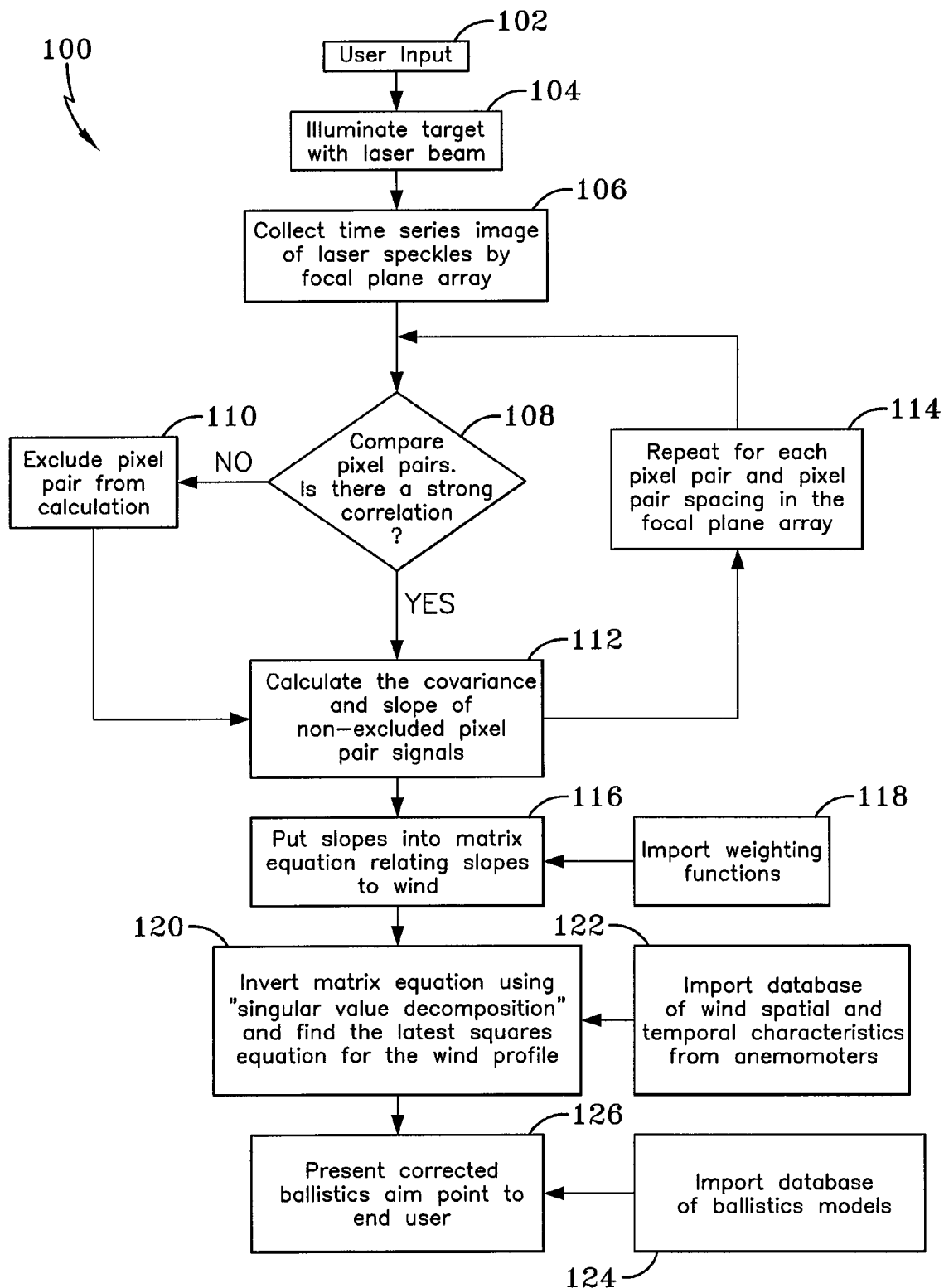
FIG. 6 is an operational flowchart showing the operation of the assisted sighting system constructed according to the concepts of the present invention.

Referring now to FIG. 6, an operational flowchart illustrating how the system 20 is used is designated generally by the numeral 100. First, at step 102 the spotter 30 uses the buttons 60, 62 to provide user input 90 to the controller 80. This user input 90 may include specifications about the ammunition and weapon used by the sharpshooter, and may optionally be selected from the pre-entered ballistics database 84. User input may also be in the form of focusing the optics 76 to acquire range information of the target 34.

Next, the sharpshooter 28 and the spotter 30 begin the process of using the system 20. The sharpshooter 28 looks through the viewing area 44 of telescopic sight 24 to find the distant target 34. The spotter 30 looks at the display 56 visible through the viewing window 54 of the spotter scope 26 to also find the distant target 34. A larger field of regard is visible through the spotter scope 26 than the sharpshooter sees in the viewing area 44 in order to facilitate the spotter's role of observing features surrounding distant target 34.

The spotter 30 provides an appropriate user input 90 that instructs the controller 80 to activate the illuminator 64 for a short period of time, possibly a few seconds, at step 104. A relatively short laser transmit time is chosen in order to help preserve the stealth of the sharpshooter 28 and the spotter 30, who might be detectable because of the radiation source. It also helps to reduce the power consumed by the device.

The imaging device 66 then collects the laser radiation from reflected return signals 74 at step 106. The focal plane array 78 generates detection signals in relation to the return signals 74 that are focused by the optics 76 within the spotter scope 26. The detection signals generated by the individual pixels of the focal plane array 78 are then sent to the controller 80.

At step 108, the controller 80 analyzes and processes the detection signals which are representative of the return signals 74 to determine whether there is a strong correlation between pixel pairs. Specifically, when the light-sensing pixels of the focal plane array 78 detect light at particular wavelengths, the pixels generate a detection signal in relation to the amount of light detected at each pixel, possibly processed through an analog-to-digital (A/D) converter. These detection signals are received and processed by the controller 80. First, the detection signals are normalized to account for differences between the pixels' performance. Next, the detected signals from pixel pairs are compared. In other words, each pixel is paired with every other pixel in the array so as to form a "pixel pair." Each pair, also referred to as two detectors, are observed or monitored by the controller to ultimately determine an aggregate wind value. As previously discussed, the eddies have a finite size. As a result, the two detectors placed near one another will sample a light ray which has traversed nearly the same eddy distribution. The scintillation patterns are then said to covary with respect to each other. As the pixels of each pixel pair are located further apart, the degree of commonality of their optical paths decreases. This degree of commonality is measured by way of a covariance coefficient. Because the optical path of the outgoing beam is scintillated from optical turbulence, it stands to reason that if the wind blows that turbulence across the field of view, signals from two closely spaced detectors may be correlated. Therefore, if the wind transports the same turbulence eddies from the field-of-regard (FOR) of one detector to the FOR of the other, they may have very similar signal characteristics, except delayed. The delay duration and shape of the time-dependent covariance curve is representative of the wind. The measure which helps determine the wind profile is the time-derivative of the covariance function. If it is determined that there is not a strong correlation between a specific pixel pair, then at step 110 that particular paid may be excluded.

Upon completion of both steps 108 and 110, the controller, at step 112, calculates the covariance and slope (time derivative) of the non-excluded pixel pairs. In other words, the controller calculates the time covariance of light and filters and rejects aspects of the signal which are considered to be noise. The covariance of two time-dependent variables x(t) and y(t) is given by $$\text{Covariance}[x(t), y(t)] = \sum_t [x(t) - \bar{x}][y(t) - \bar{y}] \quad (1)$$

Where $\bar{x}$ and $\bar{y}$ are the time averages of the variables.

The slope, or time-derivative, of the covariance, E can be found by differentiating this expression with respect to time $$\frac{d}{dt}\{\text{Covariance}[x(t), y(t)]\} = \sum_t \left[\frac{d}{dt}x(t) - \bar{x}\right][y(t) - \bar{y}] \quad (2)$$

$$= \sum_t [x(t) - \bar{x}]\left[\frac{d}{dt}y(t) - \bar{y}\right]$$

Covariance of the light intensity observed on two detectors (a pixel pair) is a function of their separation and is an integrated effect along the optical paths. All parts of the optical path are not equal, however. Light rays which emanate from a point source toward two widely spaced detectors will have a common optical path only near the source. Meanwhile, light rays which emanate from a point source toward two detectors in close proximity share nearly the same optical path. The integration of the light path with respect to the turbulence spectrum gives rise to a weighting function which is used slightly later in the process. The weighting function describes the commonality of the two optical paths and is similar statistically, and the time derivative of the weighting function describes the rate of change of the commonality of the two optical paths. The measurement of the time-derivative of the covariance function is then the result of integrating a weighting function with the wind. By varying the distance between detectors and taking many measurements between various pixel spacings, the weighting function can be tailored to create a profile of the wind along the path.

The controller calculates the time-dependent covariance curve for all pixel pairs in the array. In some configurations of the system, fewer covariance curves may be calculated based on a variety of filtering criteria. The covariance between signal pairs measures the degree to which the optical paths are similar. The slope of the covariance curve is a measure of how fast the optical paths are changing with respect to each other, and therefore, how fast the wind is blowing the turbulence across the field of view. At step 114, these two steps are repeated for each pixel pair in the focal plane array.

Next, at step 116, the slopes are entered into a matrix equation relating covariance slopes to wind speed. At this time, at step 118, the previously calculated weighting functions are imported into the matrix equations. In other embodiments, multiple distinct matrix equations may be used to provide multiple calculated wind speeds.

At step 120, the controller 80 inverts the matrix equation, possibly using Singular Value Decomposition (SVD). The matrix equation which relates the slopes of covariances, E(ρ), to the wind, v(z) is $$\begin{bmatrix} E(\rho_1) \\ E(\rho_2) \\ E(\rho_n) \end{bmatrix} = \begin{bmatrix} W(\rho_1, z_1) & W(\rho_2, z_1) & W(\rho_n, z_1) \\ W(\rho_1, z_2) & W(\rho_2, z_2) & W(\rho_n, z_2) \\ W(\rho_1, z_m) & W(\rho_2, z_m) & W(\rho_n, z_m) \end{bmatrix} \cdot [v(z_1)\ v(z_2)\ v(z_m)] \quad (3)$$

Where ρ is the pixel separation, z is the distance along the path and W is a matrix made of weighting functions given by $$W(\rho, z) - \int_0^\infty dK K^{-\frac{5}{3}} \sin^2\left[\frac{K^2 z(L-z)}{2kL}\right] J_1\left(\frac{K\rho z}{L}\right) \quad (4)$$

With L the optical path length and K the spectrum of turbulence eddies which is familiar to people skilled in the art. The K spectrum characterizes the size of the lenslets which the laser beam traverses along the optical path, and may be commonly referred to as the Kolmogorov spectrum, familiar to those in the art of free-space laser propagation. The wind velocity, v(z), can be deduced from the above by inverting the equation by SVD, familiar to people skilled in the art of mathematics. The SVD method gives a solution to the wind profile comprised as the sum of the eigenvectors of the measuring system, and therefore represents the statistically most-probably wind condition which describes the scintillation statistics.

Once the covariance curves are translated into a statistically probable wind profile, that information is coupled with the characteristics of the bullet and range finder to provide an aim point correction. The wind database 82 that includes spatial and temporal information relating to wind is used by the controller 80 to relate the detected signal slopes to wind characteristics. For a specific geometry which includes the range to target, the illuminating wavelength, the focusing characteristics of the collecting aperture and the pitch of the individual pixels within the focal plane array, the slope calculation is closely related to the influence of the wind on a bullet.

The cross wind effects on the observed scintillation pattern, statistically taken as long duration ensemble averages, can be approximated by taking many measurements using many detector pairs as can be done with the focal plane array. This method of approximating a long term average allows one to create a quasi-instantaneous snapshot of the cross wind profile as opposed to creating a long-term average, which would be less useful to the shooter.

At step 124 ballistic database 84 information is imported into a ballistic hit prediction equation $$P = \sum v_z I_z \quad (5)$$

Where $I_z$ is an influencing function which is characteristic of the ammunition, the weapon, and other environmental conditions including temperature and barometric pressure, and $v(z)$ is the previously calculated wind velocity. Stated another way, determination of the aggregate wind effect on the deviation of a bullet as it travels through a cross wind is an integrated effect. For most bullets at most sniper and hunter engagement scenarios, the cross wind at, or very near, the shooter has a much larger effect on the deviation of resulting hit point than a cross wind encountered very near the target. This effect is typically referred to as a lever-arm effect. The overall deviation of the bullet due to a cross wind can be predicted by integrating the cross wind velocity with a ballistics weighting function, denoted by I, in the equation above. The spotter scope 26 may include a previously stored ballistics database 84 having ballistics information for the types of ammunition and weapons used with the system 20. For instance, the system 20 may be used with a rifle shooting Black Hills 175 gr .308 ammunition, and this particular combination will have specific ballistic characteristics such as muzzle velocity, energy, ballistic coefficient, and maximum effective range. In any event, at step 126, the corrected ballistics aim point information is transferred to the sharpshooter. Based on the calculated wind profile and distance to the distant target, and using the ballistics information, the controller 80 calculates corrective aiming instructions 40, 42 that are wirelessly communicated to the telescopic sight 24. In other words, with both the wind profile and distance to the distant target 34 calculated, the controller 80 presents this information on the display 56 in a format that is perceivable by the spotter 30 when looking through the viewing window 54. The aim point information may be presented to the shooter as a numerical hold-off distance, moving indicator, or other intuitive display which gives the shooter information about the effects of a cross-wind and range on the intended trajectory of the bullet.

Figure 5:
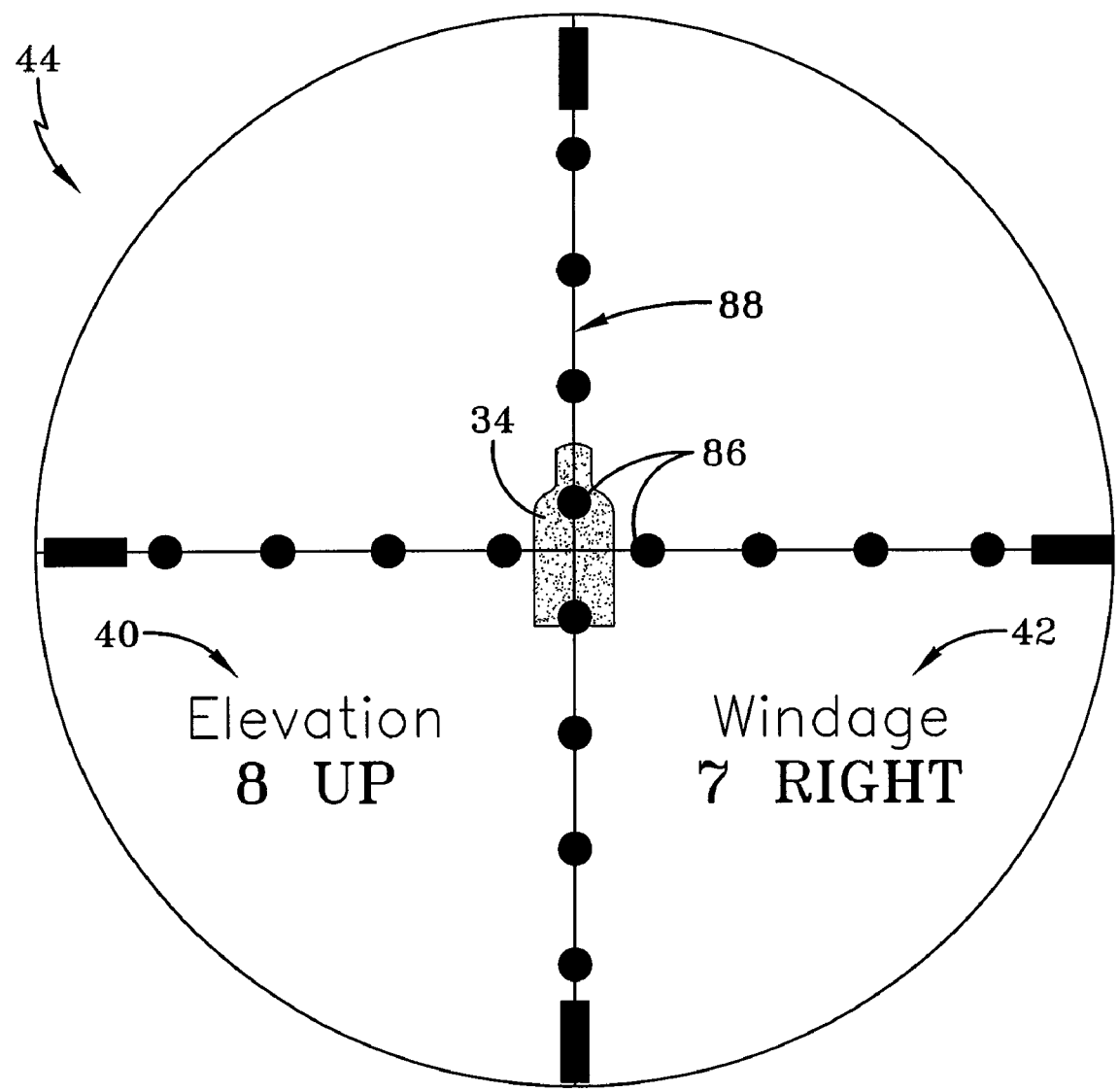
FIG. 5 is a simulated image displaying corrective aiming instructions as would be seen in a telescopic sight, which is part of the assisted sighting system.

These corrective aiming instructions 40, 42 are seen in FIG. 5 and represent vertical and horizontal corrective aiming instructions, accordingly. That is, the sharpshooter 28 looks into a viewing area 44 of the telescopic sight 24 and sees that in order to hit the distant target 34, the sharpshooter 28 must correct for elevation (or bullet drop) by adjusting "8 UP" and for windage by adjusting "7 RIGHT." The units of the corrective aiming instructions 40, 42 relate to the distance between marks 86 on the vertical and horizontal axes of the reticle 88 shown in FIG. 5. The display may also take the form of an alternate cross-hair which shows the relative position of aim point to predicted point of impact for a bullet. Other information may also be contained in the display, such as atmospheric information including temperature, barometric pressure, or average wind speed; bearing with respect to the Earth Spin, or other information useful to those skilled in the art.

In summary, the controller 80 uses the detection signals to determine the precise distance to the distant target 34 and to calculate the wind profile between the spotter scope 26 and the distant target 34. This information is presented to the spotter 30 in a form that is perceivable by looking at the display 56. Based on the calculated distance to the distant target and wind profile, and using ballistics information associated with the ammunition and weapon input by the spotter 30, the controller 80 generates corrective aiming instructions 40, 42 that are provided to the sharpshooter 28. These corrective aiming instructions 40, 42 are wirelessly communicated to the telescopic sight 24 and are perceived by the sharpshooter 28. The sharpshooter 28 adjusts the aim of rifle 22 accordingly, and then fires a bullet.

Using the assisted sight system and the information it provides, a sharpshooter is more likely to achieve the goal of hitting a distant target with just one shot. The present invention is also advantageous in that the aggregate wind value can be calculated quickly, the information can be communicated to the shooter in such a way that he can adjust his aim point for both the wind and the range, and he improves his probability of hitting the intended target on the first shot.

Thus, it can be seen that the objects of the invention have been satisfied by the structure and its method for use presented above. While in accordance with the Patent Statutes, only the best mode and preferred embodiment has been presented and described in detail, it is to be understood that the invention is not limited thereto or thereby. Accordingly, for an appreciation of the true scope and breadth of the invention, reference should be made to the following claims.

What is claimed is:

1. An assisted sighting system for aiming at a target, comprising:
   a laser that generates a ranging signal projected at a target which returns a reflected return signal;
   a collimating system which is sized to emit spherical waves of said ranging signal so that a spatio-temporal image of unfocused spherical waves representing the target is returned in said reflected signals;
   an imaging device including a single focal plane array that collects reflected return signals so as to generate an illumination pattern of the target, said focal plane array comprising an array of pixels that receive each said reflected return signal which represents the illumination pattern as a spatio-temporal image; and
   a controller connected to said illuminator and said imaging device, wherein said controller
      calculates a distance to the target,
      compares said spatio-temporal images from successive reflected return signals to generate a crosswind profile between the spotter scope and the target based on scintillation statistics of backscatter radiation detected by said focal plane array, and
      generates corrective aiming instructions based on said crosswind profile.

2. The system according to claim 1, further comprising:
   a display connected to said controller which receives and displays said corrective aiming instructions.

3. The system according to claim 1, further comprising:
   a ballistics database connected to said controller, said controller incorporating ballistics characteristics of a weapon and ammunition into the corrective aiming constructions.

4. The system according to claim 1, further comprising:
   a wind database connected to said controller, said controller incorporating spatial and temporal information into the corrective aiming instructions.

5. The system according to claim 1, wherein each said pixel generates a detection signal which is received and processed by said controller, said controller comparing each said detection signal with each other said detection signal so as to calculate a covariance and slope of each detection signal pair.

6. The system according to claim 5, wherein said slope values are input into a matrix equation along with selected weighting functions so as to determine said corrective aiming instructions.

7. The system according to claim 1, wherein said illuminator, said imaging device and said controller are carried by a spotter scope.

8. The system according to claim 7, further comprising:
a telescopic sight associated with a weapon, wherein said spotter scope communicates said corrective aiming instructions to said telescopic sight.

9. The system according to claim 1, further comprising:
user input buttons connected to said controller for control of the system.

10. The system according to claim 1, further comprising:
optics coupled to said focal plane array so as to project said reflected return signal on to said focal plane array.

11. A method of improving a shooter's accuracy when firing ammunition from a weapon, the method comprising:
illuminating a target with a ranging signal generated by a laser wherein the target returns a reflected return signal;
emitting said ranging signals from a collimating system so as to emit spherical waves so that a spatio-temporal image of unfocused spherical waves representing the target is returned in said reflected signals;
collecting with a single focal plane array an illumination pattern generated by spatio-temporal images that represent the target and backscatter radiation included in said reflected return signals;
calculating a distance to the target;
calculating a wind profile between the laser and said target based on scintillation statistics of backscatter radiation detected by said focal plane array as determined by said spatio-temporal images;
comparing successive spatio-temporal images to generate a crosswind profile;
calculating aiming instruction corrections based on the distance to the target, ballistics information for the ammunition and the weapon, and said crosswind profile; and
displaying the aiming instruction corrections.

12. The method according to claim 11, further comprising:
processing said collected backscatter radiation so as to calculate a covariance and slope value; and
inputting said slope values into a matrix equation along with selected weighting functions so as to determine the aiming instruction corrections.

13. The method according to claim 11, further comprising:
communicating the aiming instructions to the weapon.

14. The method according to claim 11 further comprising:
associating each pixel of said focal plane array as a detector which generates a detection signal; and
comparing each said detection signal with each other detection signal so as to calculate a covariance and a slope value for each detector pair.

15. The method according to claim 14, further comprising:
inputting said slope values into a matrix equation along with weighting values to generate said aiming instructions.

* * * * *